United States Patent Office 3,679,442
Patented July 25, 1972

3,679,442
HOT-PRESSED TITANIUM NITRIDE-TITANIUM CARBIDE COMPOSITIONS
Horacio E. Bergna, Wilmington, Del., assignor to E. I. du Pont de Nemours and Company, Wilmington, Del.
No Drawing. Filed Nov. 21, 1969, Ser. No. 878,891
Int. Cl. C04b 35/52
U.S. Cl. 106—43                                    4 Claims

ABSTRACT OF THE DISCLOSURE

Solid solutions of from 10 to 90 volume percent titanium nitride and 90 to 10 volume percent titanium carbide having an average grain size of less than 2 microns and a density of at least 99 percent of theoretical are prepared by hot-pressing an intimate mixture of fine powdered titanium nitride and titanium carbide at a temperature between 1750° and 1900° C. and a pressure between 3000 and 6000 pounds per square inch. The dense compositions are very strong and hard and possess a very desirable combination of oxidation resistance, wear-resistance, scratch-resistance and corrosion resistance.

BACKGROUND OF THE INVENTION

Solid solutions of titanium nitride and titanium carbide have been prepared in the past by sintering mixed powders at temperatures of about 3000° to 3200° C., R. Kieffer and F. Benesovsky, Hartstoffe, pp. 352–353, Springer-Verlag, Vienna (1963); and by cold-pressing and sintering at a temperature of 2425° C., P. Duwez and F. Odell, J. Electrochem. Soc. 97 (1950). However, dense solid solutions of titanium nitride and titanium carbide having low porosity and small grain size are unknown to the art. The high temperatures used in prior art methods of preparation tend to cause particle growth and resulting larger grain sizes. The vast body of art available on nitride and carbide cutting tools such as U.S. Pats. Nos. 1,895,959 and 1,996,220 and more recently No. 3,409,416 and No. 3,409,419 are inapplicable because metals or alloys were used in such compositions and they traditionally function as pressing aids in achieving low porosity.

I have discovered that titanium nitride and titanium carbide function as mutual sintering aids and as mutual grain-growth inhibitors at temperatures below 1900° C. and that dense fine-grained bodies of these two components can be prepared by hot-pressing intimately mixed fine powders of the two components at a temperature between 1750° and 1900° C. and a pressure between 3000 and 6000 pounds per square inch. The resulting hot-pressed compositions are strong and hard and resistant to wear, scratching, oxidation and corrosion.

SUMMARY

In summary this invention is directed to hot-pressed solid solutions of from 10 to 90 volume percent titanium nitride and from 90 to 10 volume percent titanium carbide having a density in excess of 99 percent of theoretical and an average grain size of less than 2 microns, and to the method of preparing such solid solutions by heating homogeneous mixtures of titanium carbide and titanium nitride powder having a particle size of less than one micron to a temperature between 1750° and 1900° C. and immediately pressing at a pressure between 3000 and 6000 pounds per square inch and then rapidly cooling the resultant compact.

The resulting dense compositions are useful in making wear- and corrosion-resistant parts of exceptional strength and hardness and can be fabricated into attractive articles of jewelry.

DESCRIPTION OF THE INVENTION

This invention is directed to hot-pressed solid solutions of 10 to 90 volume percent titanium nitride and 90 to 10 volume percent titanium carbide having a density in excess of 99 percent of theoretical and an average grain size of less than 2 microns and to the method of preparing such solid solutions by heating homogeneous mixtures of titanium nitride and titanium carbide powders having an average particle size of less than 1 micron to a temperature of between 1750° and 1900° C. and immediately pressing at a pressure between 3000 and 6000 pounds per square inch and then rapidly cooling the resultant compact.

Components

The titanium nitride and titanium carbide suitable for use in preparing the solid solutions of this invention should have an average particle size of less than one micron and preferably less than 0.5 micron.

Suitable titanium nitride can be obtained commercially as −325 mesh powder from Materials for Industry, Inc., Ambler, Pa. or Consolidated Astronautics Inc., Long Island City, N.Y. or can be prepared by conventional methods as disclosed in U.S. Pat. No. 3,409,416, in U.S. Pat. No. 3,409,419 or in the 'Nitrides" chapter VIII in the book "High Temperature Technology," by J. M. Blocher, Jr., John Wiley & Sons, N.Y., 1956.

Suitable titanium carbide can be obtained commercially as −325 mesh powder from Materials for Industry Inc., Ambler, Pa. or Cerac Inc., Butler, Wis., or can be prepared by conventional methods well known to the art.

If the titanium nitride or titanium carbide obtained has too large a particle size, it can be reduced by simply milling the titanium nitride until the desired comminution is achieved.

The two components are preferably quite pure and it is particularly important that they be substantially free of impurities such as oxygen which have deleterious effects on the solid solutions. Minor amounts of impurities normally picked up in milling or mixing the components have no deleterious effect on the solid solutions. Thus small amounts of low melting metals such as cobalt, iron, nickel or higher melting metals such as tungsten and molybdenum which are ordinarily encountered in milling equipment or media can be tolerated as can small amounts of refractory materials such as other carbides, nitrides or oxides which are encountered in the handling described above.

Preparation

Inasmuch as titanium nitride alone, and titanium carbide alone can be pressed to low porosity only with extreme difficulty using very high temperatures and pressures, it is quite surprising that finely powdered mixtures of the two can be hot-pressed to solids of fine grain size and low porosity at what amounts to relatively low-temperatures and pressures. It is believed that this can be accomplished because the two components serve as mutual pressing aids and grain growth inhibitors.

The powder mixtures are prepared much in the manner described in U.S. Patent No. 3,413,392. Suitable titanium nitride and titanium carbide as described above is homogeneously intermixed such as by ball-milling for up to 120 hours. The mixed powders are then hot-pressed at temperatures of from 1750° to 1850° C. and pressures of from 3000 to 6000 pounds per square inch followed by rapid cooling of the compact in the manner described in copending application Ser. No. 737,223 filed June 14, 1968 and application Ser. No. 737,142 filed June 14, 1968.

Solid solutions

The hot-pressed solid solutions are characterized by a porosity of less than one percent which translates into a density of at least 99 percent of theoretical, and an average grain size of less than 2 microns. The preferred solid solutions of this invention contain from 30 to 70 volume percent titanium nitride, from 30 to 70 volume percent titanium carbide and have an average grain size of less than one micron. The chemical content as well as the physical properties of the compositions of this invention can be determined by methods well known in the art and described in detail in the U.S. Patents Nos. 3,409,416; 3,409,419; and 3,413,392 referred to above.

The solid solutions of this invention demonstrate a hardness up to 93 to 94 on the Rockwell A scale and a transverse rupture strength of about 140,000 to 180,000 pounds per square inch. This combination of strength and hardness along with their low porosity, fine grain size and refractory nature make the solid solutions useful in applications requiring corrosion resistance, oxidation resistance, scratch resistance and wear resistance. Moreover, the presence of no metal makes them particularly useful in applications involving molten metals because of their tendency not to wet with molten metals. Thus high temperature crucibles and dies are a logical use for the solid solutions of this invention. In addition their distinctive color combined with their resistance to scratching and marring make them desirable for use in articles of jewelry such as watch cases.

This invention is further illustrated by the following illustrative examples wherein parts and percentages are by weight unless otherwise noted.

EXAMPLE 1

This is an example of a composition containing 70 volume percent of titanium nitride and 30 volume percent of titanium carbide.

The titanium nitride used is −325 mesh grade powder available from Materials for Industry, Inc., and has a specific surface area of 1.1 square meters per gram as determined by nitrogen adsorption. An electron micrograph of the powder shows dense particles of irregular shapes with sizes between 1 and about 10 microns, the bulk being between 1 and 2 microns. The carbon content is 0.33 percent and the oxygen is 0.87 percent. Chemical analysis reveals 76.19 percent of titanium and 18.71 percent nitrogen.

The titanium carbide powder used has a nominal average particle size of 0.6 micron as measured by the Fisher Sub-Sieve Sizer and a specific surface area of about 10 square meters per gram as determined by nitrogen adsorption. This titanium carbide powder "milled to 0.6 micron" grade is commercially available from the Adamas Carbide Corp., Kenilworth, N.J. An electron micrograph of a dry mount preparation shows that the titanium carbide grains are between 0.2 and 3 microns in diameter and sometimes are clustered in the form of loose aggregates. The titanium content is about 77.8 percent, the total carbon content is about 18.8 percent, the free carbon is around 0.07 percent, and the oxygen analyses indicate the oxygen content may vary between about 0.8 to 1.6 percent. Analysis by emission spectroscopy shows that titanium is the major component and also gives 0.5 to 2 percent molybdenum, 0.5 to 2 percent tungsten, 0.5 to 2 percent nickel, 500 to 2500 p.p.m. of aluminum, 200 to 1000 p.p.m. of cobalt, 300 to 1500 p.p.m. of iron, 300 to 1500 p.p.m. of niobium, 200 to 1000 p.p.m. of chromium, 200 to 1000 p.p.m. of silicon, 100 to 500 p.p.m. of zirconium, 50 to 250 p.p.m. of calcium, 50 to 250 p.p.m. of manganese, and 5 to 25 p.p.m. of magnesium.

The powders are milled by loading 6000 parts of preconditioned cylindrical cobalt-bonded tungsten carbide inserts, ¼ inch long and ¼ inch in diameter, into a 1.3 liter steel rolling mill about 6 inches in diameter, also charged with 290 parts of "Soltrol" 130 saturated paraffinic hydrocarbon, boiling range 165–210° centigrade. The mill is then charged with 113.7 parts of the titanium nitride and 44.25 parts of the titanium carbide, both as described above.

The mill is then sealed and rotated at 90 revolutions per minute for 5 days. The mill is then opened and the contents emptied while keeping the milling inserts inside. The mill is then rinsed out with "Soltrol" 130 several times until all of the milled solids are removed.

The milled powder is transferred to a vacuum evaporator, and the excess hydrocarbon is decanted off after the suspended material has settled. The wet residual cake is then dried under vacuum with the application of heat until the temperature within the evaporator is between 200° and 300° C., and the pressure is less than about 0.1 millimeter of mercury. Thereafter the powder is handled entirely in the absence of air.

The dry powder is passed through a 70 mesh screen in a nitrogen atmosphere, and then stored under nitrogen in sealed plastic containers.

A consolidated billet is prepared from the powder by hot pressing the powder in a cylindrical graphite mold having a cavity with a square cross-section 1¹⁄₁₆ inch x 1¹⁄₁₆ inch and fitted with opposing close-fitting pistons. One piston is held in place in one end of the mold cavity while 29 parts of the powder are dropped into the cavity under nitrogen and evenly distributed by rotating the mold and tapping it lightly on the side. The upper piston is then put in place under hand pressure. The assembled mold and contents are then placed in a vacuum chamber of a vacuum hot press, the mold is held in a vertical position, and the pistons extending above and below are engaged between opposing graphite rams of the press under pressure of about 600 p.s.i. Within a period of a minute the mold is raised into the hot zone of the furnace at 1175° C. and at once the furnace temperature is increased to 1800° C. in 10 minutes. The temperature of the mold is held at 1800° C. for another 2 minutes to ensure uniform heating of the sample. A pressure of 4000 p.s.i. is then applied to the sample through the pistons for four minutes. Immediately after pressing, the mold and contents, still being held between the opposing rams, is moved out of the furnace into a cool zone where the mold and contents are cooled to dull red heat in about 5 minutes.

The mold and contents are then removed from the vacuum furnace and the billet is removed from the mold and sand blasted to remove any adhering carbon.

Density of the finished piece as determined by accurate weighing and measurement of the dimensions is 5.28 grams per cubic centimeter, which corresponds to the theoretical density.

The hot-pressed composition is nonporous, having no visible porosity under 1000× magnification. This property is important since nonporous materials are more corrosion resistant than porous materials of the same chemical composition. Structurally it consists of an extremely fine polycrystalline network. Electron micrographs indicate a very fine grain structure, few grains exceeding 1 to 2 microns in size. The specimen is so tough that it does not break or chip when dropped freely to a hardwood floor from a height of 7 feet.

The sample is polished by pressing its faces firmly against rotating diamond impregnated cloth discs. A Beuhler polishing machine is employed for this operation. A 400 grit diamond wheel is used at 1175 revolutions per minute in the first polishing step and a 1000 grit diamond at 550 revolutions per minute is used in a second, finishing step.

The sample polished in this manner has an attractive ornamental appearance with a golden color and is useful in making articles of jewelry.

A second sample of the same size is fabricated as above indicated and cut so that 0.070 inch x 0.070 inch square bars for transverse rupture strength are separated from each side of a center piece. Portions of the sample are used for indentation hardness tests and for other product characterization. The average rupture strength as measured by pending the 0.070 inch x 0.070 inch test bars on a 9/16 inch span is about 165,000 p.s.i. The hardness is 93.2 on the Rockwell A scale.

One of the bars used for transverse rupture measurement is crushed and ground up in a carbon steel mortar and the powder thus obtained is used in X-ray diffraction analysis. The X-ray diagram obtained shows a strong face centered cubic pattern with a lattice parameter of 4.2689. This pattern corresponds to a titanium nitride-titanium carbide solid solution. The lattice parameters of face centered cubic titanium nitride and titanium carbide are about 4.24 and about 4.32, respectively. All lattice parameters are given in $kX$ units.

The dense composition shows excellent oxidation and corrosion resistance, resistance to thermal shock, resistance to scratching, and low reactivity with metals.

The unusual combination of high strength and high hardness added to the above mentioned characteristics makes the composition of this example an excellent material for wear parts, for example as a high temperature thrust bearing or in corrosion resistant parts, such as ring seals for acid circulating pumps.

EXAMPLE 2

The procedure of Example 1 is repeated except that the components are used in amounts to give a composition containing 70 volume percent titanium carbide and 30 volume percent titanium nitride.

The actual amounts loaded into the 1.3 liter steel mill are 103.5 parts of titanium carbide powder and 48.8 parts of titanium nitride powder.

A consolidated billet is fabricated by hot pressing, and is tested as indicated in Example 1. X-ray diffraction analysis shows the composition to be a solid solution of titanium carbide and titanium nitride. The density is 5.03 grams per cubic centimeter which is over 99 percent of the theoretical density.

Average transverse rupture strength measured is 165,000 p.s.i. and average Rockwell A hardness is 93.4.

The composition of this example shows excellent oxidation and corrosion resistance, resistance to thermal shock, resistance to scratch, and low reactivity with metals.

The unusual combination of high strength and high hardness added to the above mentioned characteristics makes the composition of this example an excellent material for wear and corrosion resistant parts.

I claim:

1. A hot-pressed solid solution consisting of essentially of 10 to 90 volume percent titanium nitride and 90 to 10 volume percent titanium carbide having a density in excess of 99 percent of theoretical, an average grain size of less than 2 microns, a hardness of about 93 to 94 on the Rockwell A scale, and a transverse rupture strength of about 140,000 to 180,000 p.s.i.

2. A solid solution of claim 1 in which the average grain size is less than 1 micron.

3. A solid solution of claim 1 in which the volume percent of titanium nitride is 30 to 70 and the volume percent of titanium carbide is 70 to 30.

4. A solid solution of claim 3 in which the average grain size is less than 1 micron.

References Cited

UNITED STATES PATENTS

| | | | |
|---|---|---|---|
| 2,814,566 | 11/1957 | Glaser | 106—43 |
| 3,011,982 | 12/1961 | Madur et al. | 106—55 X |
| 3,205,084 | 9/1965 | Klein et al. | 106—299 X |
| 3,242,664 | 3/1966 | LeDerrey | 58—88 |
| 3,409,416 | 11/1968 | Yates | 29—182.5 |
| 3,502,447 | 3/1970 | Daniels | 29—182.5 |

FOREIGN PATENTS

| | | | |
|---|---|---|---|
| 1,808,600 | 7/1969 | Germany | 106—43 |

OTHER REFERENCES

Kingery, W. D.: Ceramic Fabrication Processes, New York, 1958, p. 154.

Kingery, W. D.: Theoretical Aspects of Hot Pressing, in Ceramic Fabrication Processes; New York, 1958, pp. 161–5.

TOBIAS E. LEVOW, Primary Examiner

W. R. SATTERFIELD, Assistant Examiner

U.S. Cl. X.R.

106—55; 29—182.5, 182.7